US012809768B1

(12) United States Patent
Colline et al.

(10) Patent No.: US 12,809,768 B1
(45) Date of Patent: Nov. 24, 2026

(54) METHOD AND APPARATUS FOR INLINE DATA DESCRIPTOR PROCESSING BY A NVME PROCESSING DEVICE

(71) Applicant: Marvell Asia Pte Ltd, Singapore (SG)

(72) Inventors: Phillip Colline, Tustin, CA (US); Randall Brown, Tustin, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/990,751

(22) Filed: Dec. 20, 2024

Related U.S. Application Data

(60) Provisional application No. 63/699,091, filed on Sep. 25, 2024.

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
USPC ......................................................... 711/103
See application file for complete search history.

(56) References Cited

U.S. PATENT DOCUMENTS

| | | | | |
|---|---|---|---|---|
| 10,235,097 B2 * | 3/2019 | Singh | .................. | G06F 12/0246 |
| 12,306,766 B1 * | 5/2025 | Lercari | ................. | G06F 12/109 |
| 2018/0329816 A1 * | 11/2018 | Hsu | ..................... | G06F 11/1004 |
| 2020/0050402 A1 * | 2/2020 | Furey | .................... | G06F 3/0688 |
| 2020/0050403 A1 * | 2/2020 | Suri | ...................... | G06F 3/0665 |

* cited by examiner

*Primary Examiner* — Gautam Sain

(57) ABSTRACT

A new approach supports inline data descriptor processing by a multi-port NVMe processing device in real time. The NVMe processing device receives a NVMe read or write command from a host at one of its front-end ports to read data from or write data to a NVMe device, respectively, wherein the NVMe command includes a plurality of data descriptor related memory addresses on the host. The NVMe processing device modifies a plurality of bits in one or more of the plurality of data descriptor related addresses in the NVMe command inline before sending the NVMe command to the NVMe device. The NVMe processing device then receives, processes, and forwards the one or more memory write or memory read commands issued by the NVMe device according to the modified plurality of data descriptor related addresses to the host via the front-end port from which the NVMe command is received.

20 Claims, 5 Drawing Sheets

METHOD AND APPARATUS FOR INLINE DATA DESCRIPTOR PROCESSING BY A NVME PROCESSING DEVICE

RELATED APPLICATION

This application is a nonprovisional application and claims the benefit and priority to a provisional application No. 63/699,091 that was filed on Sep. 25, 2024, which is incorporated herein by reference in its entirety.

BACKGROUND

Non-Volatile Memory Express (NVMe) is a protocol designed to use the PCI Express (PCIe) bus to connect NVMe devices such as solid-state drives (SSDs) to hosts. A NVMe processing device, which can be but is not limited to a NVMe bridge device, often has a need to efficiently process direct memory access (DMA) requests in the form of NVMe commands from a host attached at a front-end port of the NVMe bridge device to a NVMe device (e.g., a SSD storage drive) attached at a back-end port of the NVMe bridge device. Some contexts of a NVMe command available at the command receipt phase may need to be referenced during data transfers. One example of such context is a port flag identifying which front-end port is associated with the NVMe command. This information is known at the time the command is received by the NVMe bridge device but is not accessible during data transfers where only PCIe transport layer packets (TLPs) are being used except via the memory addresses available therein. In some case, the context is encoded into unused bits in all memory addresses originating from the NVMe device and it is extracted during data transfers.

For a non-limiting example, the NVMe bridge device can be a 2×1 bridge having two front-end ports and a single back-end port, wherein the NVMe bridge device tags addresses in a NVMe command to indicate which front-end port the NVMe command originally arrived from the host. When the back-end drive attempts a PCIe memory read or write command to the host, the NVMe bridge device needs to direct the memory read or write command to the correct front-end port based solely on the addresses (since there is no command context to reference and addresses can themselves be identical across host ports). In some cases, all addresses originating from the back-end NVMe drive need to have a port flag bit set in order to inform the NVMe bridge device which front-end port is associated with the NVMe command.

Current solutions of address tagging (e.g., port flagging) often entail the NVMe bridge device reading a pointer to one DMA data descriptors from the incoming NVMe command and proceeding to pre-fetch the associated list of the DMA data descriptors from a host memory into a local memory of the NVMe bridge device. The NVMe bridge device then modifies the DMA data descriptors to reflect the port in a memory address bit (e.g., the uppermost bit) and remap the NVMe command to point to the local memory instead of the host memory before finally submitting the NVMe command to the back-end NVMe drive. These solutions, however, may increase latency of the NVMe command and memory requirements for the NVMe bridge device. They may further complicate error recovery (since the local memory must be freed during aborts) and cause significant mismatch between performance of various ports of the NVMe bridge device.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
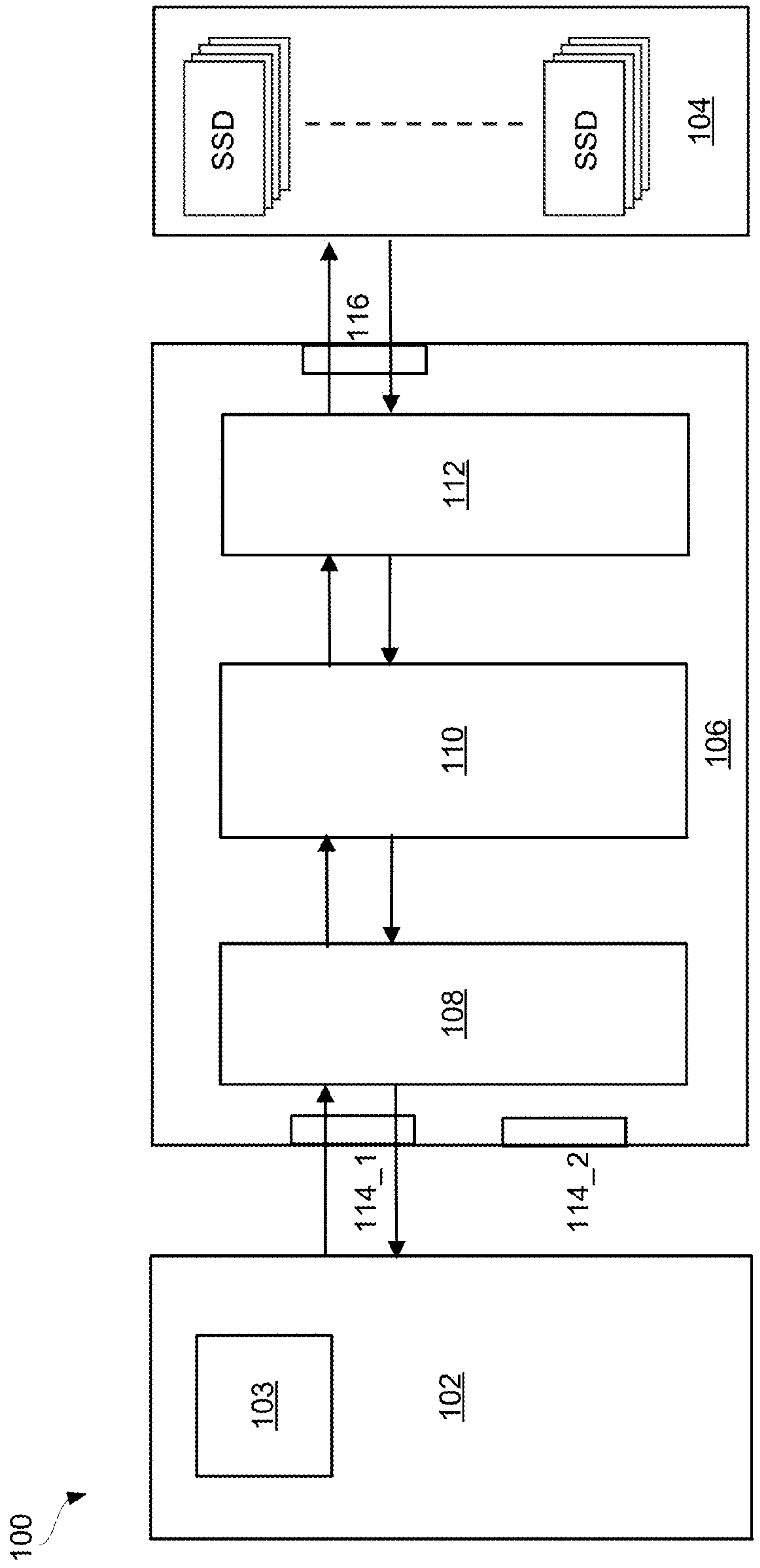
FIG. 1 depicts an example of a diagram of a system to support inline data descriptor processing by a multi-port NVMe processing device in real time according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates system and method to support inline data descriptor processing by a multi-port NVMe processing device in real time. Under the proposed approach, the NVMe processing device receives/ intercepts a NVMe read or write command from a host at one of a plurality of front-end ports to read data from or write data to a NVMe device (e.g., a NVMe storage device), respectively, wherein the NVMe command includes a plurality of data descriptor related memory addresses on the host. The NVMe processing device modifies/sets a plurality of bits in one or more of the plurality of data descriptor related addresses in the NVMe command inline before sending the NVMe command to the NVMe device. Once the NVMe device issues one or more memory write or memory read commands to access one or more memory addresses on the host according to the modified plurality of data descriptor related addresses in the NVMe command, the NVMe processing device processes and forwards the one or more memory write or memory read commands to the host via the front-end port from which the NVMe command is received. The one or more memory write or memory read commands are then executed by the host to access the corresponding memory addresses on the host.

By performing cut-through data descriptor processing and address modification inline in real time, the proposed approach avoids manually pre-fetching the data described by the data descriptors of a NVMe command into the local memory of the NVMe processing device ahead of time. As a result, no extra local memory on the NVMe processing device or data descriptor associated context structures for buffering each incoming NVMe command from the host is required. In addition, the proposed approach is programmable and has no additional error recovery considerations or memory cleanup needed for the NVMe command. By applying the proposed approach to all front-end ports of the NVMe processing device, performance among the front-end ports can be matched.

Another example of command context that may be preserved via the proposed cut-through approach is the PCIe Traffic Class (TC), which is a type of PCIe Quality of Service (QoS). Under the proposed approach, TC is honored in the same way as a port number throughout the IO cycle. More generally, any encodable information using one or more address bits known at the command processing phase could benefit from the proposed approach.

Although a two front-end port one back-end port (2×1) NVMe bridge device is used as a non-limiting example of the NVMe processing device to illustrate the proposed approach hereinafter, the same or similar approach can be equally applied to other types of NVMe processing devices having any number of front-end ports and back-end ports (e.g., 4×1, 2×2, etc.) attached to one or more hosts at the front-end and one or more NVMe devices at the back-end, respectively, as understood by one ordinarily skilled in the art.

Although a NVMe (I/O) read command is used as a non-limiting example of a NVMe command to illustrate the proposed approach hereinafter, the same or similar approach can be equally applied to other types of NVMe commands, e.g., a NVMe write command intended to write data from the host memory to the NVMe device, as understood by one ordinarily skilled in the art.

Although a NVMe storage device/drive is used as a non-limiting example of a NVMe device to illustrate the proposed approach hereinafter, the same or similar approach can be equally applied to other types of NVMe devices as understood by one ordinarily skilled in the art.

Although port flag setting is used a non-limiting example of NVMe command modification to illustrate the proposed approach hereinafter, the same or similar approach can be equally applied to setting or modification of other types of command contexts. For a non-limiting example, PCIe TC associated with the NVMe command as discussed above may be selected and/or modified (alternatively or in combination) for preservation as understood by one ordinarily skilled in the art.

FIG. 1 depicts an example of a diagram of a system 100 to support inline data descriptor processing by a multi-port NVMe processing device in real time. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a host 102, an NVMe storage device/drive 104, and a multi-port NVMe processing device 106, which further includes a front-end interface 108, a command processor 110, and a back-end interface 112. Here, the host 102 can be a computing device, a communication device, a storage device, or any computing device having a processor (not shown) and a memory 103 capable of running a software component. For non-limiting examples, a computing device can be but is not limited to a server machine, a laptop PC, a desktop PC, a tablet, a Google Android device, an iPhone, an iPad, and a voice-controlled speaker or controller. The NVMe storage device 104 can be but is not limited to a SSD device, which does not require power to retain data. For non-limiting examples, the SSD device can include one or more of NAND flash memory, NOR flash memory, resistive random-access memory (ReRAM), ferroelectric random-access memory (FeRAM), magnetoresistive random-access memory (MRAM), and phase-change random-access memory (PCRAM). The multi-port NVMe processing device 106 has one or more front-end ports 114*s*, wherein each of the front-end ports 114 is attached (electronically or communicatively coupled) to a host (e.g., the host 102). The multi-port NVMe processing device 106 also has one or more back-end ports 116*s*, wherein each of the back-end ports 116 is attached to a NVMe device (e.g., the NVMe storage drive 104).

Figure 2:
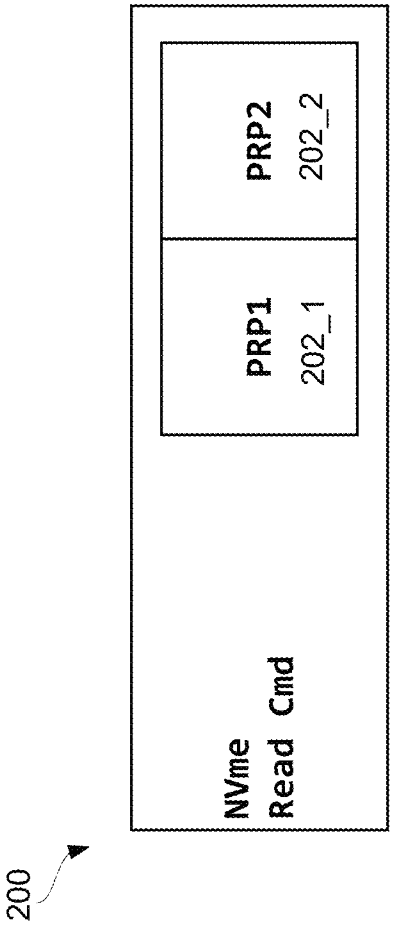
FIG. 2 depicts an example of a format of a NVMe read command, which includes a plurality of data descriptors used to specify memory addresses on the host used for data transfers according to one aspect of the present embodiments.
Figure 3A:
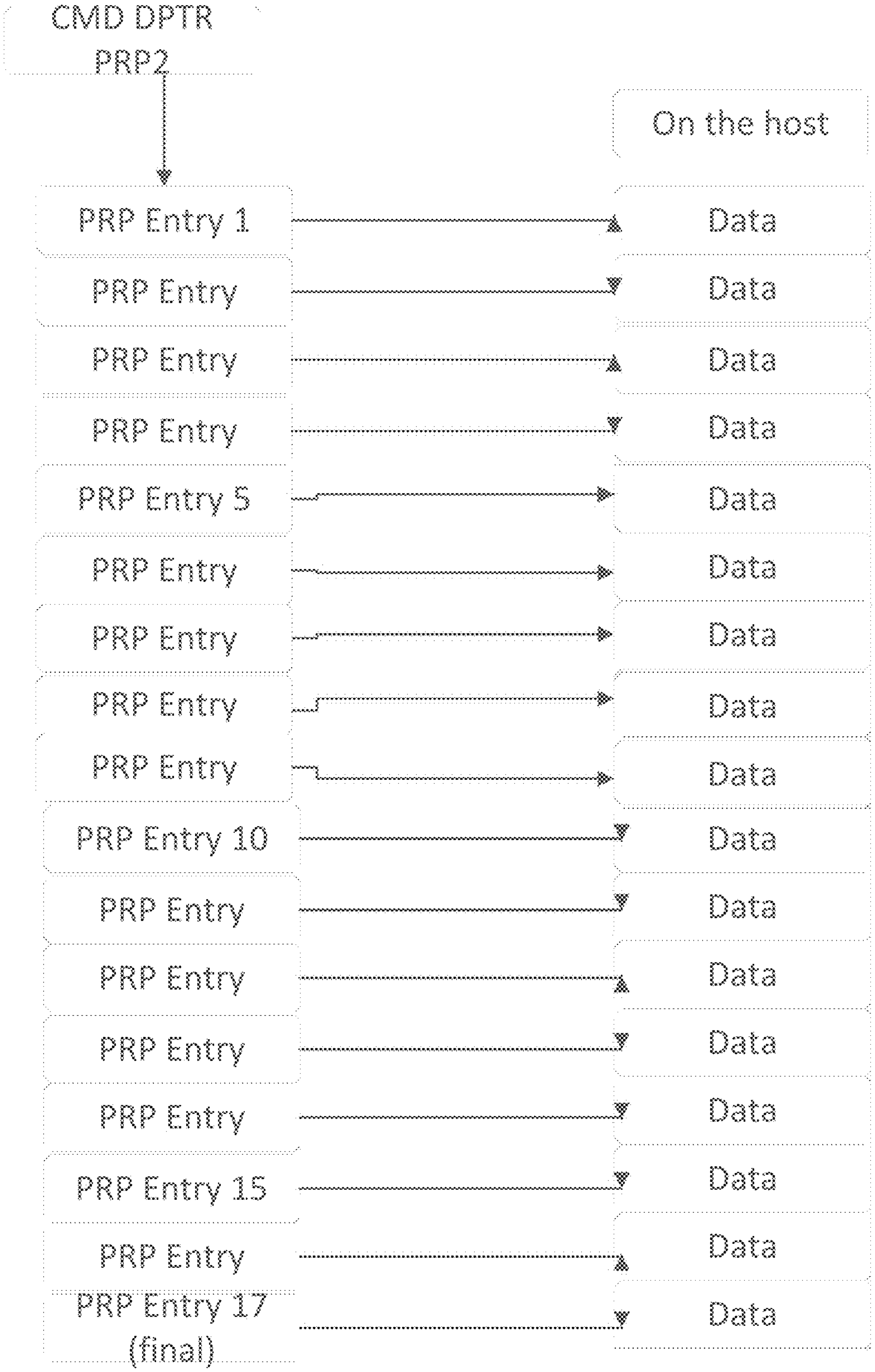
FIG. 3A depicts an example of the first PRP list pointed to by PRP2 in the NVMe read command, wherein the first PRP list includes entries pointing to corresponding memory addresses on the host where data to be read is stored according to one aspect of the present embodiments.

In the example of FIG. 1, the front-end interface 108 of the multi-port NVMe processing device 106 is configured to accept a NVMe command, e.g., NVMe read command, from the host at one of the plurality of front-end ports e.g., 114_1, wherein the NVMe read command is intended to read data from the NVMe storage drive 104 to the memory 103 on the host 102 through the front-end port 114_1. FIG. 2 depicts an example of a format of the NVMe read command 200, which includes a plurality of data descriptors 202*s* (e.g., 202_1, 202_2, . . . 202_N), also referred to herein as physical region pages (PRPs), wherein the PRPs are used to specify memory addresses on the host 102 used for data transfers. For example, in some embodiments, one of the data descriptors 202_1, PRP1, is an address pointing to a memory location on the host 102 where data read from the NVMe storage drive 104 is to be stored at the memory address. Since data is typically read from the NVMe storage drive 104 in chunks/pages of certain size, e.g., 4 KB/page, additional host addresses may be needed when the NVMe read command is intended to read a large amount of data. In some embodiments, one of the data descriptors 202_2, PRP2, is an address pointing to a memory location on the host 102 where a PRP list (the first PRP list) is stored. Here, the first PRP list includes a plurality of memory addresses on the host 102 where data read from the NVMe storage drive 104 is to be stored. For a non-limiting example, assuming a PRP list is 4 KB in size and each address of 8 bytes represents a 4 KB page in host memory then the single 4 KB PRP list may represent 2 MB (4 KB PRP list/8 bytes*4 KB memory page) of data. FIG. 3A depicts an example of the first PRP list pointed to by PRP2 in the NVMe read command, wherein the first PRP list includes 17 entries pointing to corresponding memory addresses on the host 102 where data to be read is stored. In some embodiments, the first PRP list further includes an address on the host 102 where a second PRP list is stored. As such, the NVMe read command may accommodate a large amount of data to be stored at a plurality of addresses of the host as described in the first and second PRP lists in addition to the address of PRP1 202_1.

In the example of FIG. 1, the command processor 110 of the multi-port NVMe processing device 106 is configured to intercept and modify one or more of the plurality of data descriptors 202*s* in the received NVMe command inline in real time before passing the NVMe command to the NVMe drive 104. In some embodiments, the command processor 110 is configured to utilize and set one or more bits in the one or more of the plurality of data descriptors 202*s*, e.g., PRP1 and/or PRP2. Specifically, in some embodiments, the command processor 110 is configured to utilize and set a first bit, e.g., the highest bit 63 of a 64-bit address in PRP1, as a port flag to indicate which of the front-end port (e.g., 114_1) of two front-end ports (e.g., 114_1 and 114_2) the NVMe command is received from the host 102. In some embodiments, the command processor 110 is configured to utilize a second bit, e.g., bit 62, as a PRP list related flag to indicate whether the address points to a PPR list or not, e.g. bit 62 in PRP2 pointing to a PRP list address is set while bit 62 in PRP1 pointing to a data address is not. Once the relevant bits are set, the command processor 110 is configured to send the modified NVMe command with the set bits in the one or more data descriptors 202*s* to the NVMe drive 104 through the back-end interface 112 and back-end port 116.

In the example of FIG. 1, the NVMe drive 104 is configured to issue one or more memory access commands back to the multi-port NVMe processing device 106 through the back-end interface 112 to access the memory 103 on the host 102 according to the modified NVMe command. In some embodiments, if the NVMe command is a NVMe read command, the NVMe drive 104 is configured to issue a memory write (MemWr) command to write a single chunk of data to a memory location of the host 102 based on the modified address and bits of PRP1. In some embodiments, the command processor 110 of the multi-port NVMe processing device 106 is configured to check the modified flags in the MemWr command. Since the PRP list related flag (e.g., bit 62) is not set in PRP1, the command processor 110 needs to clear the front-end port flag from the incoming address prior to forwarding the MemWr command via the front-end interface 108 and through the front-end port 114 indicated by the modified port flag of PRP1 to the host 102 to be executed.

In some embodiments, if the PRP list related flag (e.g., bit 62) is set in PRP2, meaning that PRP2 points to a memory location on the host 102 where the first PRP list is stored, the NVMe drive 104 is configured to issue a memory read (MemRd) command to read the PRP list from the host 102 at address specified in PRP2. The command processor 110 of the multi-port NVMe processing device 106 determines that the MemRd command is PRP list related by checking the PRP list related flag in the address PRP2, clears the PRP related flag from the address, and forwards the MemRd command to the host 102 as a TLP packet. The host 102 responds to the MemRd command by fetching the PRP list from its memory at the address PRP2 and provides the PRP list to the multi-port NVMe processing device 106 through its front-end interface 108. Upon receiving and identifying/recognizing that what is received from the host 102 is the PRP list (as indicated by the PRP list related flag in the address PRP2), the command processor 110 of the multi-port NVMe processing device 106 is configured to modify/set the port flag of every address in the PRP list, e.g., bit 63 of every 8 bytes in the PRP list, and send the modified PRP list to the NVMe drive 104 in cut-through fashion, e.g., no store and forward, etc. on the multi-port NVMe processing device 106. In some embodiments, all entries in the PRP list are considered PRP addresses and therefore get their port flags set as needed. In some embodiments, the command processor 110 is configured to send the modified PRP list to the NVMe drive 104 in the form of a TLP command with the port flag set (e.g., bit 63) for every address on the PRP list. The NVMe drive 104 is then configured to issue a MemWr command to write a single chunk of data to a memory location of the host 102 for every address on the PRP list through the front-end port 116 indicated by the modified port flag of the address. As such, no PRP list storage or related context is needed on the multi-port NVMe processing device 106.

Figure 3B:
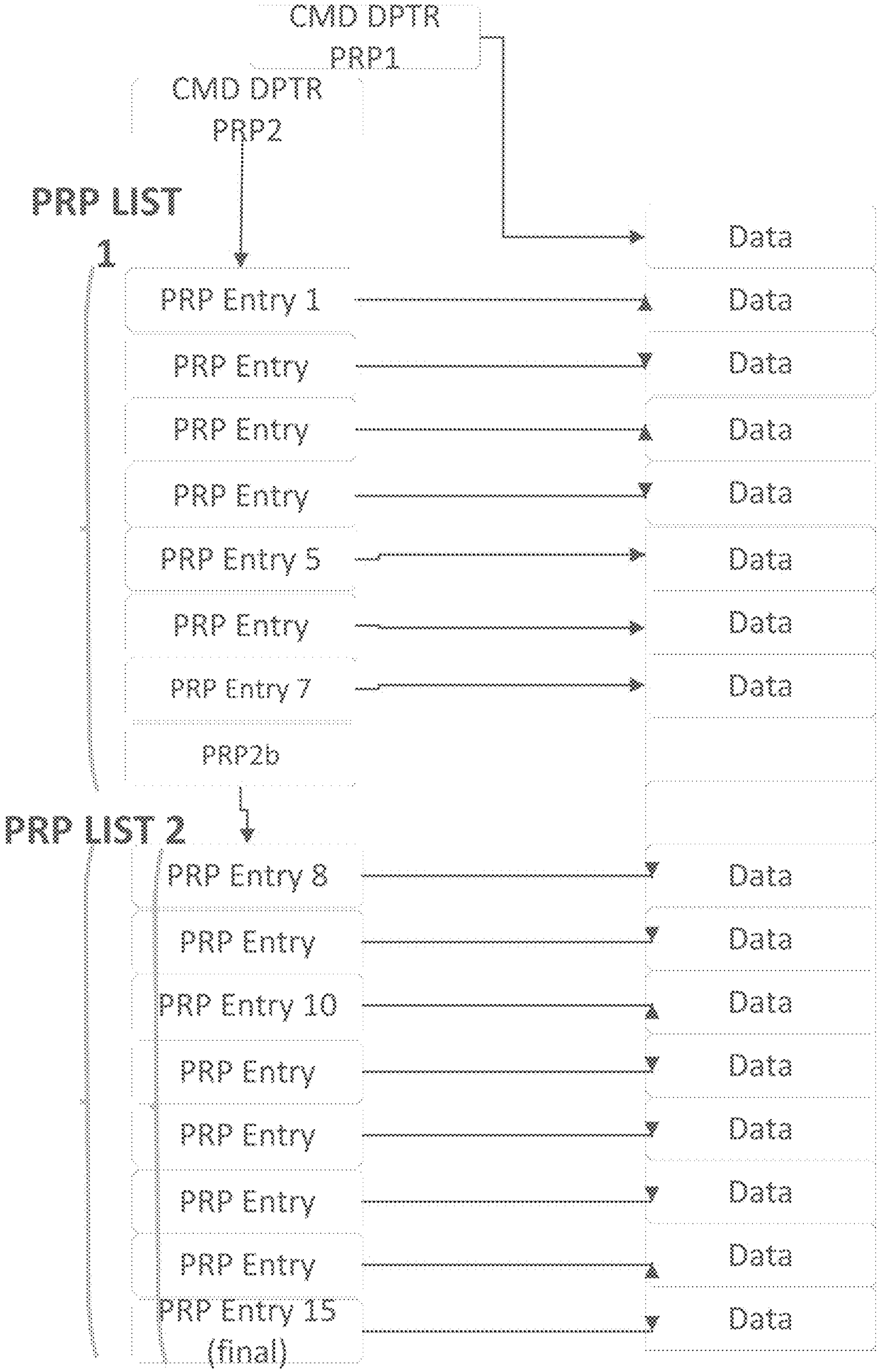
FIG. 3B depicts an example of the second PRP list pointed to by PRP2*b* in the first PRP list as pointed by PRP2 in the NVMe read command according to one aspect of the present embodiments.

In some embodiments, when the NVMe command employs read or write a large amount of data, the command processor 110 is configured to utilize a third bit, e.g., bit 61, of PRP2 as an intermediate address flag to indicate whether PRP2 points to an intermediate (e.g., a first of two or more) PRP list address, meaning either there are multiple PRP lists that need to be processed or there is only a final or single PRP list needs to be processed. In the case where the intermediate address flag is set, the command processor 110 is configured to link multiple PRP lists together by tagging the final address (e.g., PRP2*b* in PRP List 1 from FIG. 3B) in the first PRP list pointed by PRP2 as being associated with a second PRP list (e.g., PRP List 2 from FIG. 3B) of a plurality of addresses on the host 102 where data will be stored. For example, the PRP list related flag (e.g., bit 62) of PRP2*b* can be set to indicate that the final address is PRP list related. FIG. 3B depicts an example of the second PRP list pointed to by PRP2*b* in the first PRP list as pointed by PRP2 in the NVMe read command. As shown by the example of FIG. 3B, each of the first and the second PRP lists has 8 entries and the last entry in the first PRP list PRP2 points to the address of the second PRP list. The rest of the entries in the first and second address list as well as PRP1 point to a memory location on the host 102 where data read is to be stored.

Similar to the processing of the first PRP list, the NVMe drive 104 is configured to issue a MemRd command to read the second PRP list from the host 102 at address specified in PRP2*b*. The command processor 110 of the multi-port NVMe processing device 106 determines that the MemRd command is PRP list related by checking the PRP list related flag in the address PRP2*b*, clears the flag, and forwards the MemRd command to the host 102. The host 102 responds to the MemRd command by fetching the second PRP list from its memory at the address PRP2*b* and provides the second PRP list to the multi-port NVMe processing device 106 through its front-end interface 108. Upon receiving and identifying/recognizing that what is received from the host 102 is the second PRP list (as indicated by the PRP list related flag in the address PRP2*b*), the command processor 110 is configured to modify/set the port flag of every address in the second PRP list, e.g., bit 63 of every 8 bytes in the second PRP list, and send the modified second PRP list to the NVMe drive 104 in cut-through fashion. The NVMe drive 104 is then configured to issue a MemWr command to write a single chunk of data to a memory location of the host 102 for every address on the second PRP list through the front-end port 114 indicated by the modified port flag of the address.

Figure 4:
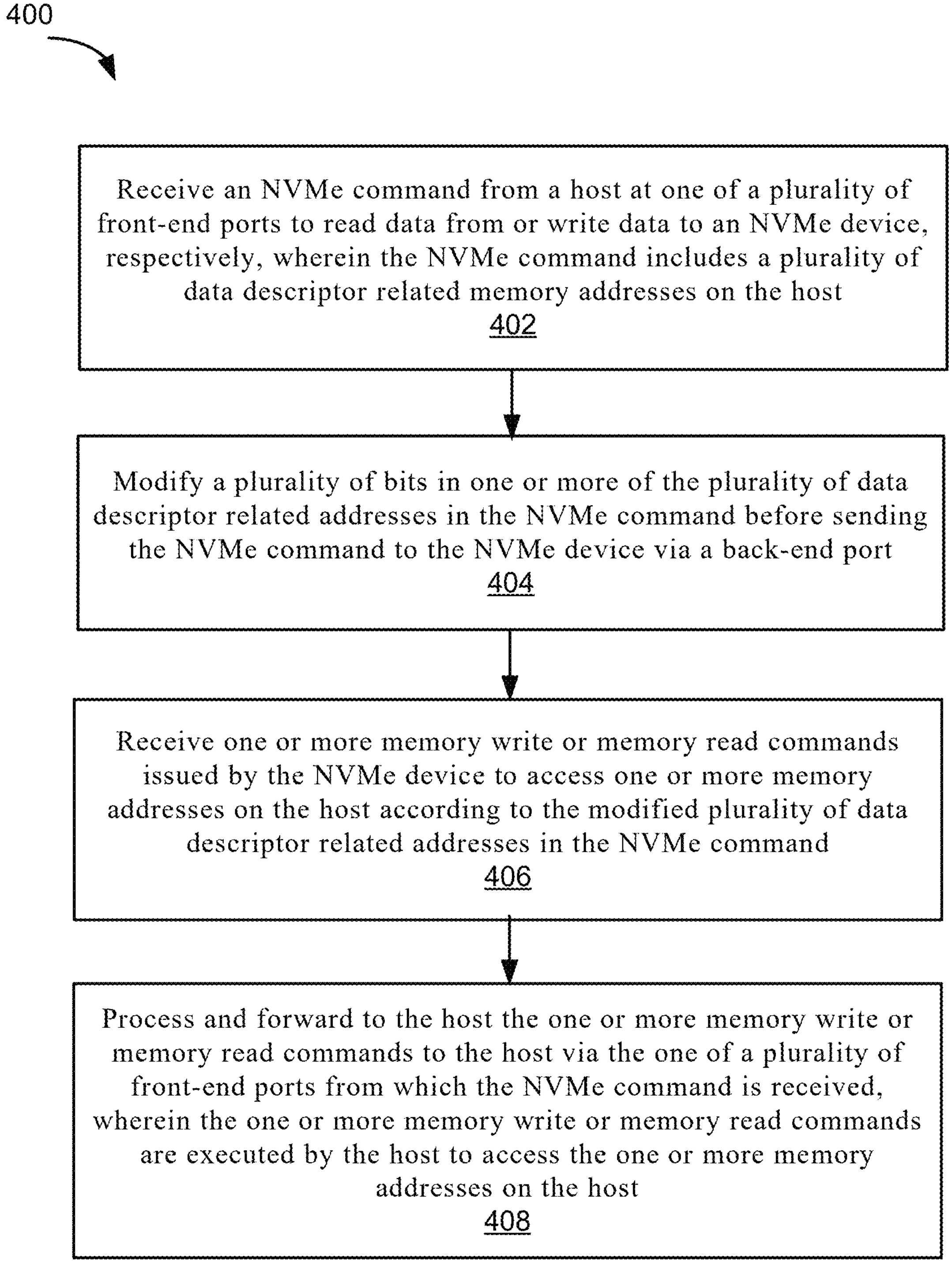
FIG. 4 depicts a flowchart of an example of a process to support inline data descriptor processing by a multi-port NVMe processing device in real time according to one aspect of the present embodiments.

FIG. 4 depicts a flowchart 400 of an example of a process to support inline data descriptor processing by a multi-port NVMe processing device in real time. Although the figure depicts functional steps in a particular order for purposes of illustration, the processes are not limited to any particular order or arrangement of steps. One skilled in the relevant art will appreciate that the various steps portrayed in this figure could be omitted, rearranged, combined, and/or adapted in various ways.

In the example of FIG. 4, the flowchart 400 starts at block 402, where a NVMe command is received from a host at one of a plurality of front-end ports to read data from or write data to a NVMe device, respectively, wherein the NVMe command includes a plurality of data descriptor related memory addresses on the host. The flowchart 400 continues to step 404, where a plurality of bits in one or more of the plurality of data descriptor related addresses in the NVMe command are modified before sending the NVMe command to the NVMe device via a back-end port. The flowchart 400 continues to step 406, where one or more memory write or memory read commands issued by the NVMe device to access one or more memory addresses on the host according to the modified plurality of data descriptor related addresses in the NVMe command are received. The flowchart 400 ends at step 408, where the one or more memory write or memory read commands to the host are processed and forwarded to the host via the one of a plurality of front-end ports from which the NVMe command is received, wherein the one or more memory write or memory read commands are executed by the host to access the one or more memory addresses on the host.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. An apparatus to support inline Non-Volatile Memory Express (NVMe) data descriptor processing in real time, comprising:

a NVMe processing device having a plurality of front-end ports and one or more back-end ports and configured to
receive a NVMe command from a host at one of the plurality of front-end ports to read data from or write data to a NVMe device, respectively, wherein the NVMe command includes a plurality of data descriptor related memory addresses on the host;
modify a plurality of bits in one or more of the plurality of data descriptor related addresses in the NVMe command before sending the NVMe command to the NVMe device via one of the one or more back-end ports;
receive one or more memory write or memory read commands issued by the NVMe device to access one or more memory addresses on the host according to the modified plurality of data descriptor related addresses in the NVMe command; and
process and forward to the host the one or more memory write or memory read commands to the host via the one of a plurality of front-end ports from which the NVMe command is received, wherein the one or more memory write or memory read commands are executed by the host to access the one or more memory addresses on the host.

2. The apparatus of claim 1, wherein:
the NVMe device is a SSD device.

3. The apparatus of claim 1, wherein:
a first address of the plurality of data descriptor related memory addresses points to a memory location on the host where data read from or written to the NVMe device is stored.

4. The apparatus of claim 3, wherein:
a second address of the plurality of data descriptor related memory addresses points to a memory location on the host where a first address list is stored, wherein the first address list includes a plurality of memory addresses on the host where data read from or write to the NVMe device is stored.

5. The apparatus of claim 4, wherein:
the NVMe processing device is configured to utilize and set a first bit in the first address and a first bit in each address of the first address list pointed to by the second address as a port flag to indicate the front-end port the NVMe command is received from the host.

6. The apparatus of claim 5, wherein:
the NVMe processing device is configured to process and forward a memory write command to the host via the indicated front port to write data to the first address and/or each address of the first address list to the host.

7. The apparatus of claim 4, wherein:
the NVMe processing device is configured to utilize and set a second bit in the second address as an address list related flag to indicate that the second address points to the first address list.

8. The apparatus of claim 7, wherein:
the NVMe processing device is configured to process and forward a memory read command to the host to obtain the first address list from the host if the address list related flag is set.

9. The apparatus of claim 4, wherein:
the NVMe processing device is configured to utilize and set a third bit in the second address as an intermediate address flag to indicate that there is a second address list of a plurality of memory addresses on the host where data read from or write to the NVMe device is stored, to be processed, wherein an address of the second address list is one of the plurality of memory addresses in the first address list.

10. The apparatus of claim 9, wherein:
the NVMe processing device is configured to process and forward a memory read command to the host to obtain the second address list from the host if the intermediate address flag is set.

11. A method to support inline Non-Volatile Memory Express (NVMe) data descriptor processing in real time, comprising:

receiving an NVMe command from a host at one of a plurality of front-end ports of a NVMe processing device to read data from or write data to a NVMe device, respectively, wherein the NVMe command includes a plurality of data descriptor related memory addresses on the host;

modifying a plurality of bits in one or more of the plurality of data descriptor related addresses in the NVMe command before sending the NVMe command to the NVMe device via a back-end port of the NVMe processing device;

receiving one or more memory write or memory read commands issued by the NVMe device to access one or more memory addresses on the host according to the modified plurality of data descriptor related addresses in the NVMe command; and processing and forwarding to the host the one or more memory write or memory read commands to the host via the one of a plurality of front-end ports from which the NVMe command is received, wherein the one or more memory write or memory read commands are executed by the host to access the one or more memory addresses on the host.

12. The method of claim 11, wherein:

a first address of the plurality of data descriptor related memory addresses points to a memory location on the host where data read from or written to the NVMe device is stored.

13. The method of claim 12, wherein:

a second address of the plurality of data descriptor related memory addresses points to a memory location on the host where a first address list is stored, wherein the first address list includes a plurality of memory addresses on the host where data read from or write to the NVMe device is stored.

14. The method of claim 13, further comprising:

utilizing and setting a first bit in the first address and a first bit in each address of the first address list pointed to by the second address as a port flag to indicate the front-end port the NVMe command is received from the host.

15. The method of claim 14, further comprising:

processing and forwarding a memory write command to the host via the indicated front port to write data to the first address and/or each address of the first address list to the host.

16. The method of claim 13, further comprising:

utilizing and setting a second bit in the second address as an address list related flag to indicate that the second address points to the first address list.

17. The method of claim 16, further comprising:

processing and forwarding a memory read command to the host to obtain the first address list from the host if the address list related flag is set.

18. The method of claim 13, further comprising:

utilizing and setting a third bit in the second address as an intermediate address flag to indicate that there is a second address list of a plurality of memory addresses on the host where data read from or write to the NVMe device is stored, to be processed, wherein an address of the second address list is one of the plurality of memory addresses in the first address list.

19. The method of claim 18, further comprising:

processing and forwarding a memory read command to the host to obtain the second address list from the host if the intermediate address flag is set.

20. A system to support inline Non-Volatile Memory Express (NVMe) data descriptor processing in real time, comprising:

a means for receiving an NVMe command from a host at a NVMe processing device to read data from or write data to a NVMe device, respectively, wherein the NVMe command includes a plurality of data descriptor related memory addresses on the host;

a means for modifying a plurality of bits in one or more of the plurality of data descriptor related addresses in the NVMe command before sending the NVMe command to the NVMe device via a back-end port of the NVMe processing device;

a means for receiving one or more memory write or memory read commands issued by the NVMe device to access one or more memory addresses on the host according to the modified plurality of data descriptor related addresses in the NVMe command; and a means for processing and forwarding to the host the one or more memory write or memory read commands to the host from which the NVMe command is received, wherein the one or more memory write or memory read commands are executed by the host to access the one or more memory addresses on the host.

* * * * *